June 22, 1926.  
F. E. MARTIN  
HOOK DOG FOR SAWMILL CARRIAGES  
Original Filed Nov. 25, 1921    2 Sheets-Sheet 1
1,590,110
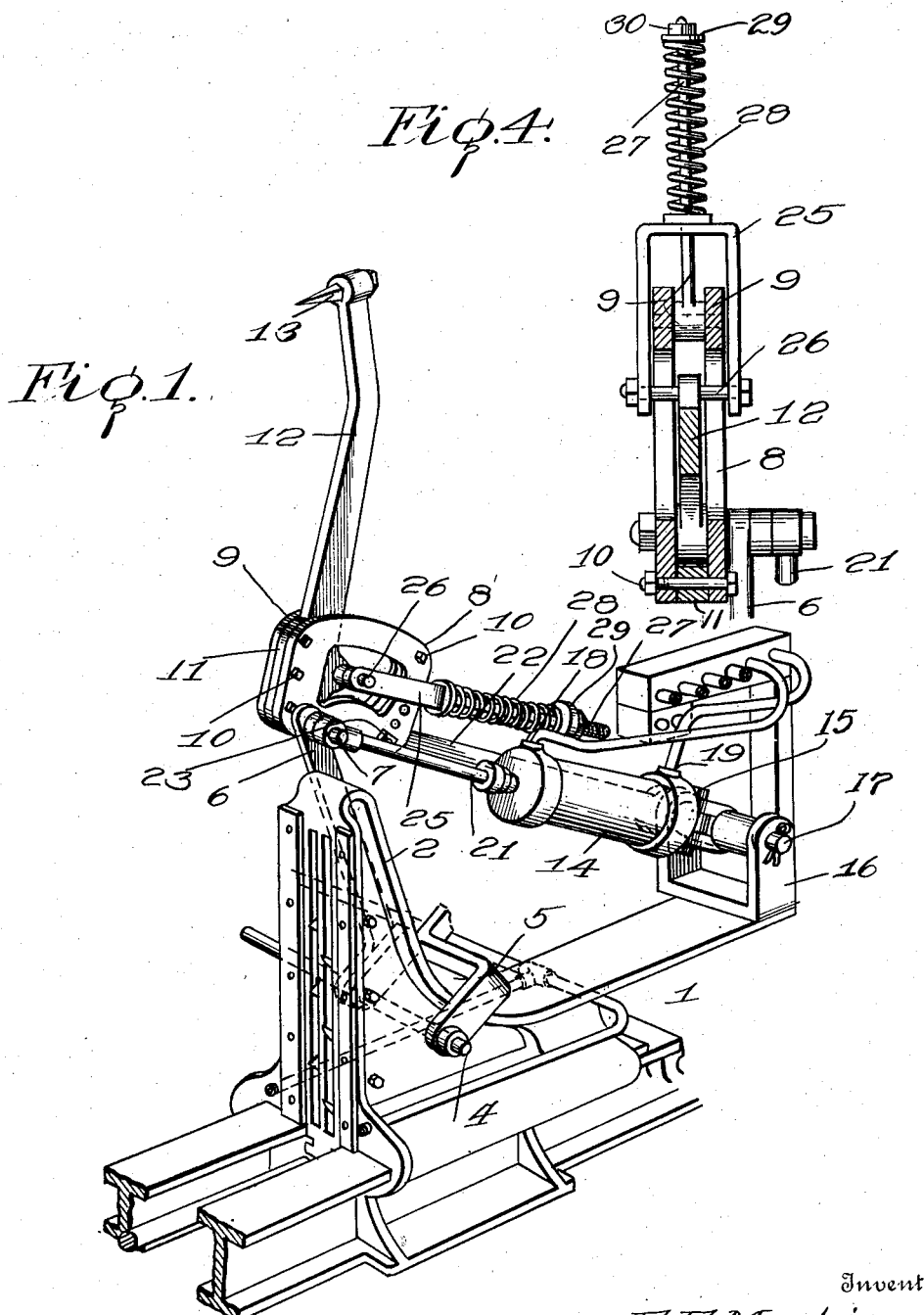
Inventor  
F. E. Martin

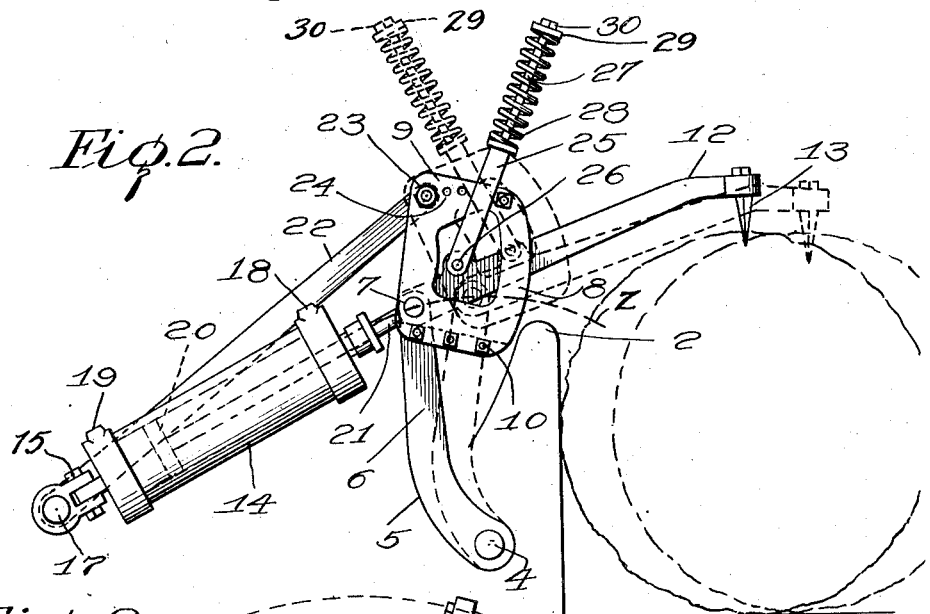
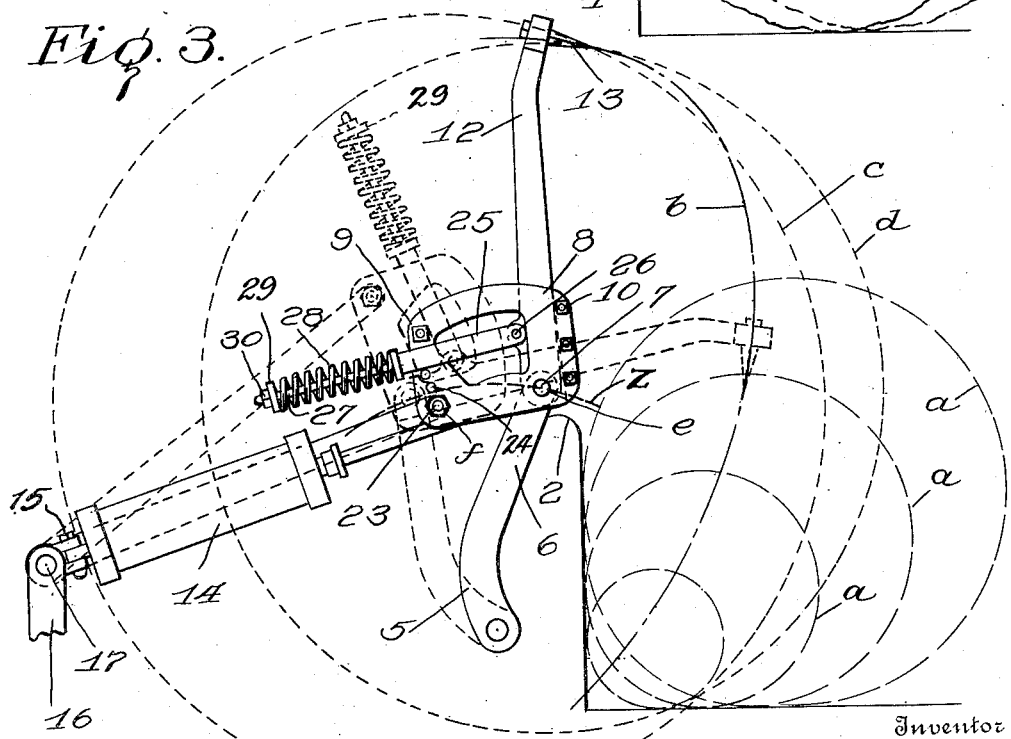

Patented June 22, 1926.

1,590,110

UNITED STATES PATENT OFFICE.

FREDERICK E. MARTIN, OF WEED, CALIFORNIA, ASSIGNOR TO MARTIN AIR DOG COMPANY, OF SAN FRANCISCO, CALIFORNIA, A CORPORATION OF CALIFORNIA.

HOOK DOG FOR SAWMILL CARRIAGES.

Original application filed November 25, 1921, Serial No. 517,647. Divided and this application filed December 8, 1922. Serial No. 605,653.

This invention is directed to an improvement in hook dogs for saw mill carriages, wherein through the mounting and operation of the hook dog, a materially improved result is secured. This application is substantially a division of my co-pending supplication filed November 25, 1921, Serial No. 517,647. The invention may be substantially stated as directed to a hook dog so mounted and operated as to cause the spike of the dog to follow a path in operation which will cause said spike to engage any one of a number of logs of different diameters at substantially the same relative location in each of said logs; to so mount the dog relative to its operating means that following the engagement of the hook dog with the log, the further and continued movement of the operating means causes the dog to move in a substantially linear direction to draw the log towards the knee; to cushion the dog in its mounting to insure a proper penetrating effect of the dog without liability of displacement due to the shocks and jars of such operation; and to so mount and operate the dog that the maximum penetrating power or blow of the dog is exerted on the largest log with which the dog may cooperate and gradually decreases throughout the full operative range of the dog.

In more specific detail, the hook dog structure of this invention involves a frame mounted for swinging movement under suitable power means with the support for the frame forming a floating fulcrum. The dog is pivotally supported in the frame and compelled to move with the frame throughout the power stroke of the dog through a resilient connection, which when the dog engages the log, permits a relative yielding between the dog and frame to cause the further movement of the frame to move the dog in a linear direction to draw the log toward the knee.

Through the specific mounting of the frame on a floating fulcrum and applying the power means beyond this fulcrum and normally between the fulcrum and the spike of the dog when the latter is in inoperative position, the power means acts initially between said operative end of the dog and the fulcrum to exert the maximum power effect on the dog, the point of application of the power to the frame thereafter gradually approaching and moving beyond a line radial to the floating fulcrum and normal to the line of travel of the power, with the effect of operating the dog with the maximum power in the initial portion of its stroke and gradually decreasing the power, through decrease of the leverage, throughout the remaining portion of the stroke.

The dog is held in desired relation to the frame for the power stroke by a spring interposed between the dog and frame and adjustable as to tension. This spring causes the dog to follow the frame as the latter is swung to thereby impart the arcuate movement to the dog, and when the spike of the dog penetrates the log, and is hence held against further movement, the spring yields to permit the frame to continue its swinging movement without correspondingly swinging the dog. This further swinging movement of the frame, by reason of the floating fulcrum, causes the dog to move in a linear direction with respect to the knee, and hence draw the log toward the knee.

The invention is illustrated in the accompanying drawings, in which:

Fig. 1 is a perspective view of a hook dog constructed in accordance with this invention and mounted in relation to the knee, the parts being shown in normal or inoperative positions.

Fig. 2 is an elevation with the parts in operative position.

Fig. 3 is a diagrammatic view showing the dog and indicating by a dot and dash line the path of travel of the dog throughout its full stroke, this view also indicating other paths of travel which the dog would follow were the dog operated about either pivots provided therefor were such pivots fixed, the illustration comparatively showing the true path of travel of the dog.

Fig. 4 is a vertical section through the dog, frame, and connected parts.

In the drawings, a saw mill carriage frame is indicated at 1, while 2 indicates a knee, all of which parts may be of any desired form or construction.

The knee 2 is provided with a bolt 4, on which is pivoted a yoke 5, having a bar, like extension 6 projecting upwardly therefrom. To the upper end of this extension 6 is pivotally connected at 7, a frame 8, hereinafter referred to as the dog frame. This frame comprises spaced identical plates 9 secured together by bolts 10 and provided with intermediate edge spacing sections 11, one of which forms a limiting abutment for the dog when in inoperative position.

A dog lever 12 having the usual terminal spike 13 is freely supported on the pivot 7 between the plates 9, the edge spacing sections between the plates being omitted to permit the necessary play or movement of the dog. The dog and frame are designed to be operated by power means, and a conventional and convenient means for this purpose is here shown as a cylinder 14 pivotally supported at the end remote from the dog frame by a pin 15 carried by a yoke 16, and is supported for rotation upon a pin 17 secured on a support extending from the knee 2. In utilizing this form of operating means, the cylinder is provided with ports 18 and 19 adjacent the respective ends thereof for the admission of air or steam under pressure to operate in the desired direction a piston 20 slidably arranged in said cylinder and having its piston rod 21 connected to the pivot pin 7. The dog frame is further supported for pivotal movement through the medium of a rod 22, pivotally connected to said frame on a pin 23 passing through the plates of the frame at a point normally in rear of the pivot 7, as shown in Fig. 3. The opposite end of the rod 22 is supported upon the pivotal mounting of the cylinder, as shown. The dog frame is provided with a series of holes 24 to provide for the adjustable connection of the rod 22 therewith, for a purpose which will later appear.

It is to be particularly noted that the dog is mounted for free play on the pivot pin 7, except for the means to be now described, and it is through the provision of such means as a yielding resilient connection that an important advantage of the structure results. This dog frame and dog connecting means comprises a yoke 25 embracing one edge of the dog frame, which frame is interiorly open, and within the frame and in advance of the pivot 7 said yoke is connected to the dog lever 12 at 26. A rod 27 is pivotally connected to one edge of the dog frame and extends through the yoke 25 beyond the frame, said rod being provided with a coil spring 28 encircling the rod and bearing at one end on the yoke 25. The opposite end of the spring is adjustably confined by a washer 29 slidable on the rod 27 and held in position to adjustably tension the spring by a nut 30 engaging the threaded free end of the rod 27.

In Fig. 1, which is the normal or inoperative positions of the parts, it will be noted that the pivots 7 and 23 are substantially in line at right angles to the face of the knee, with the pivot 7 in advance of the pivot 23 due of course to the full projection of the piston rod 21. In this position, the spring 28 exerts a sufficient pressure upon the yoke 25 to hold the hook dog lever 12 in contact with the abutment indicated at 11. As pressure is admitted to the cylinder to operate the hook dog, for example, through port 18, the piston rod is moving the pivot 7 rearwardly on dotted line z, having for its fulcrum the pin 4. The spring 28 however, still maintains the hook dog lever in contact with the abutment 11 of the dog frame with the result that said lever and therefore the penetrating spike 13 at the free end of the lever is compelled to follow the movement of the dog frame until, for example, the said spike engages and penetrates the log. During this operation however, the spike of the dog lever does not follow a true arcuate path, nor is the power communicated to the free end of such lever the same throughout its path of movement notwithstanding uniformity in the operating power admitted to the cylinder 14.

When the spike takes its bite into the log, assuming that the log is not up against the knees, the piston 20 continues its movement and the frame 8 continues its rocking motion. The spike end of the dog lever however, cannot now follow the swinging movement of the frame, as it is engaged in a log, and consequently the spring 28 yields to permit a relative movement of the dog lever and frame, and as in this continued further movement of the frame, the pivot pin 7 is necessarily moving toward the cylinder 14, along the dotted line z the dog lever and therefore the log will be moved toward the knee with substantially a linear movement, and thus the log will be drawn toward and into contact with the knee. Furthermore, from the relative arrangement of the mounting and parts connected therewith, it will be apparent that in the normal or inoperative position, the line of application of power to pivot 7 passes very close to the pivot 23 and the movement of the dog being unresisted by the work starts with great rapidity, giving penetrative force to the dog; the power acting substantially transverse to the dog bar or parallel to its dog or tooth. As the dog approaches the log, the line of power and the pivot 23 separate, increasing the power arm of the lever constituted by the frame 8 and the dog bar until the dog has reached about the position of engagement with a maximum sized log. If the dog strikes a log at this point, such change of leverage, in the absence of any resistance up to this point, has not materially lessened the speed of the dog and it penetrative effect due thereto, but if and when the dog is slowed down in entering a large sized log, the gradually increased leverage acts to force the dog into and powerfully hold the log. On the other hand, with lesser sized logs and varying according to the size of the log, the line of application of the force to pivot 7 again approaches the pivot 23 and shortens the leverage of the power, while the dog having a longer travel before striking the log, more of the momentum of its original starting motion is lost as it passes through the point of maximum increase in the power leverage, and the subsequent change of leverage is not sufficiently rapid greatly to quicken up again the speed of the dog, so that the dog strikes the log with less force while the decreasing leverage applies less final penetrative force to the dog. It will thus be apparent that by reason of the unresisted initial rapidity in the movement of the dog, the velocity and consequently the penetrative force of the tooth are at their maximums throughout the initial movement, and if in the particular structure the maximum sized log with which the dog is to cooperate will be engaged by the tooth during the gradual increase of the leverage referred to above, it will be apparent that for the maximum sized log, the penetrative force of the tooth is also at its maximum. As the power leverage shortens thereafter, that is, in moving the dog to cooperate with logs of less than the maximum size, it will be apparent that the dog will strike the log with less and less power as the diameter of the log decreases to the minimum sized log to be handled by the particular apparatus, and therefore the penetrative force of the dog decreases correspondingly. Large logs will thus be engaged with great penetrative force, while smaller logs will be engaged with less penetrative force, the purpose of which is obvious.

In Fig. 3, there is diagrammatically illustrated the described operation of the dog. In this figure, $a$ indicates logs of different diameters supported on the carriage, and $b$ indicates the path of travel of the point of the spike of the hook dog when mounted on the floating fulcrum structure herein described. In order that the irregularity of the arc of this path of movement may be graphically appreciated, there is also illustrated two additional circular paths of movement, indicated at $c$ and $d$. The centers of these respective paths of movement are indicated at $e$ and $f$, which correspond to the pivots 23 and 7, were these pivots stationary and the dog caused to operate about either as a center. This illustration emphasizes the hereinbefore stated fact that the spike of the dog first describes an abrupt curve for the initial part of its path and then moves inwardlly while still travelling in a curved path and downwardly, gradually approaching the knee and receding from the saw line. The paths $c$ and $d$ however, which are true arcs from fixed centers, move gradually from the knee and toward the saw line, and were either of these paths the true path of the dog spike, it is apparent that smaller logs would be so engaged by the dog spike as to permit little if any of the log to extend beyond such dog for saw operation.

When the spike strikes a log, the spring 28 will also serve as a cushion to take the blow, and in the further movement of the frame, as hereinbefore set forth, wherein the spring is tensioned to permit the relatively independent movement of the frame and dog, the spring operates by such increased tension to assist and gradually compel the spike to penetrate the log, and of more importance insures that the spike will be held in the log against casual displacement due to jars or vibrations.

While the floating fulcrum 23 and the brace associated therewith, offers a resistance to the movement of the pivotal support 7 under the power means, and while this arrangement is essential to produce the desired path of movement to the dog, and the additional advantages referred to, yet when the dog spike contacts with the log and the spring is thereupon further compressed, such spring provides an additional resistance to the pressure means, to thereby prevent a too rapid or violent movement of the log toward the knee.

It will be apparent that by the provision of the holes 24 in the dog frame, the floating fulcrum 23, that is, the connection of the rod 22 to the frame, may be adjusted; and that through this adjustment the path of movement of the dog may be varied with relation to the face of the knee. That is to say, the adjustable connection of the floating fulcrum with the dog frame will determine the distance of the path of movement of the spike of the dog beyond the face of the knee.

Claims:

1. In combination, a frame, a floating fulcrum for the frame, a dog mounted in the frame beyond such floating fulcrum, and a power means connected to the frame and moving the dog as a lever on such floating fulcrum, said power means acting initially to impart maximum speed to the dog under a continuously increasing power leverage, the leverage being thereafter gradually shortened to reduce the power movement of the dog, the floating fulcrum under the action of the power means causing the dog to travel in a curved path in the nature of a cycloid.

2. In combination, a frame, a floating fulcrum for the frame, a dog mounted in the frame beyond such floating fulcrum, and a power means connected to the frame and moving the dog as a lever on such floating fulcrum, said power means acting initially to impart maximum speed to the dog under a continuously increasing power leverage, the leverage being thereafter gradually shortened to reduce the power movement of the dog, and means permitting the frame to swing on the floating fulcrum under the action of the power means after the dog has engaged a log.

3. In combination, a floating fulcrum, a support therefor, a frame mounted on the floating fulcrum, means for moving the frame on said fulcrum, a dog pivoted on the fulcrum, a spring between the frame and dog to insure that both the frame and the dog will move together on the floating fulcrum until the dog contacts with a log, said spring serving thereafter to hold the dog in contact with the log while permitting a yielding movement between the frame and dog to allow the frame to continue to move.

4. In combination, a floating fulcrum, a support therefor, a frame mounted on the floating fulcrum, a dog pivoted on the frame, means to cause both the frame and the dog to move together on and with the floating fulcrum until the dog contacts with a log and thereafter hold the dog in contact with the log while the frame continues to move.

5. A saw mill carriage dog and operating means, comprising a floating fulcrum, and means for moving the dog about such fulcrum in proportionate relation to cause the dog to engage substantially the center of the top of a log regardless of substantial variation in the size of the log, and then draw the log towards the knee.

6. A saw mill carriage dog and operating means therefor, including a floating fulcrum, and means for moving the dog about such fulcrum and simultaneously moving the fulcrum in such proportionate relation as to cause the dog to engage substantially the center of the top of a log regardless of substantial variation in the size of the log.

7. A dog structure for saw mill carriages, comprising a rocking support, a swinging member mounted on said support, a dog pivotally connected to the member, and a spring between the member and the dog to cause said dog to tend to move with the member until the dog strikes a log and permit the member to continue to swing relative to the support after the dog strikes a log to thereby draw the log toward the knee, and means for operating the member.

8. A dog structure for saw mill carriages, comprising a frame, means for pivotally mounting the frame, a dog pivoted to the frame and movable therewith, a spring between the frame and the dog to cause said dog to tend to move with the frame and allow an independent swinging movement of the frame after the dog strikes a log, and means connected to the pivot between the dog and frame for operating the dog structure.

9. A dog for saw mill carriages, comprising two elements pivoted together, yielding means which alone holds the elements together in working relation and permits independent movement of said elements when the dog contacts with a log, and means for swinging the dog.

10. A dogging means for saw mill carriages, comprising a pivoted frame, a dog pivotally mounted in the frame to one side the pivot of the frame, a string between the frame and the dog, means to adjust the tension of the spring to determine the extent of movement of the frame before the dog rocks in the frame after contacting with a log, and means for swinging the frame and creating a pull on the dog.

11. A dogging means for saw mill carriages, comprising a pivoted dog, means for mounting the dog to cause same to travel in a curved path and when resistance is met in a substantially straight path, including a spring, and means to adjust the tension of the spring to determine the extent of the straight path movement of the dog, and means for operating the dog.

12. A saw mill carriage dog, means for mounting the dog to cause its operative end to travel in a curved path in the nature of a cycloid until a log is encountered and thereafter move toward the knee, and means for operating the dog.

13. A swinging hook dog, a floating fulcrum therefor, means for swinging said dog on said fulcrum and simultaneously moving the fulcrum, and cushion means brought into action when and after the dog contacts with a log to resist the dog-swinging action of the operating means.

14. A swinging hook dog, a floating fulcrum therefor, means for swinging said dog on said fulcrum and simultaneously moving the fulcrum, and cushion means associated with and movable with the hook dog and brought into action when and after the dog contacts with a log to resist the dog-swinging action of the operating means.

15. A hook dog, an operating means therefor, and a mounting for said hook dog directly actuated by said operating means, said mounting causing the operative end of the dog to follow a path of an irregular arc with initial maximum velocity and minimum power, and thereafter with gradual decreasing velocity, the power gradually increasing to a predetermined point in the movement of the dog and thereafter decreasing.

16. A hook dog, a power means therefor, and a mounting for said dog directly actuated by said power means, said mounting being supported on a floating fulcrum and the power connection to the mounting being normally between such floating fulcrum and the operative end of the dog, said power connection moving around the floating fulcrum in a direction from the operative end of the dog to thereby reduce the leverage length of the dog and cause the operative end of the dog to travel in an arc which constantly approaches the fulcrum.

17. A hook dog, an operating means therefor, a mounting in which the dog is supported and directly actuated by the operating means, said mounting providing for two movements of the dog, one toward the log and the other substantially transverse the first, and additional means for normally connecting the dog and mounting for unit movement, said means permitting relative movements of the dog and mounting when the movement of the dog is resisted as by engagement with a log.

18. A hook dog, an operating means therefor, a mounting in which the dog is supported and directly actuated by the operating means, said mounting providing for two movements of the dog, one toward the log and the other substantially transverse the first, and additional means for normally connecting the dog and mounting for unit movement, said means permitting increasingly resisted relative movements of the dog and mounting when the movement of the dog is resisted as by engagement with a log.

19. A hook dog, an operating means therefor, a mounting in which the dog is supported and directly actuated by the operating means, said mounting providing for two movements of the dog, one toward the log and the other substantially transverse the first, and spring means for connecting the dog and mounting for unit movement in the absence of resistance to dog movement.

20. A hook dog, an operating means therefor, a mounting in which the dog is supported and directly actuated by the operating means, said mounting providing for two movements of the dog, one toward the log and the other substantially transverse the first, and spring means for connecting the dog and mounting for unit movement, said means permitting relative movements of the dog and mounting when the dog engages a log.

21. A hook dog, an operating means therefor, a mounting in which the dog is supported and directly actuated by the operating means, said mounting providing for two movements of the dog, one toward the log and the other substantially transverse the first, and spring means for connecting the dog and mounting for unit movement, said means permitting increasingly resisted relative movements of the dog and mounting when the dog engages a log.

22. A hook dog, an operating means therefor, a mounting in which the dog is supported and directly actuated by the operating means, said mounting providing for two movements of the dog, one toward the log and the other substantially transverse the first, and spring means for connecting the dog and mounting for unit movement, said means permitting relative movements of the dog and mounting when the dog engages a log, and also serving to assist in holding the dog in engagement with the log during such relative movement.

23. A hook dog, an operating means therefor, a mounting in which the dog is supported and directly actuated by the operating means, said mounting providing for two movements of the dog, one toward the log and the other substantially transverse the first, and spring means for connecting the dog and mounting for unit movement, said means permitting relative movements of the dog and mounting when the dog engages a log, and also serving to assist in holding the dog in engagement with the log with increasing effect during such relative movement.

24. A hook dog, an operating means therefor, a mounting in which the dog is supported and directly actuated by the operating means, said mounting providing for two movements of the dog, one toward the log and the other substantially transverse the first, and a spring serving to connect the mounting and dog for unit movement until the dog strikes the log, said spring cushioning the dog impact and thereafter permitting relative movement between the dog and mounting.

25. In combination, a saw-mill carriage, a knee, a cylinder pivotally mounted on the knee, a rocking frame on the knee, a piston and rod pivoted to the rocking frame and operable in the cylinder, a swinging frame mounted on the pivot which connects the rocking frame and the piston rod, a hook dog mounted on said pivotal connection, spring actuated means engaging the hook dog to hold same in engaging position, a floating fulcrum between the swinging frame and the knee, and means for controlling fluid pressure to the cylinder, whereby when pressure is admitted to the cylinder, the pivotal connection and the floating fulcrum will swing the swinging frame and move the hook dog in a curved path and subsequently pull the hook dog toward the cylinder and move the engaged log up against the knee.

26. In combination, a saw-mill carriage, a knee, a hook dog, a swinging frame in which the hook dog is mounted, spring actuated means connected to and movable with the frame for holding the hook dog into biting engagement with a log, means for mounting the swinging frame to cause same to move in a curved path to correspondingly move the hook dog and subsequently after the hook dog engages the log cause said hook dog to pull in substantially a straight line and draw the log up against the knee.

27. In combination, a dog for saw mill carriages, a floating fulcrum for the dog, means connected to the dog on one side the fulcrum, and a spring on the opposite side of the fulcrum connected to the dog, whereby when the pressure operated means is actuated the dog will first rock in a curved path to engage a log and subsequently exert a pull on the log and simultaneously compress the spring, the spring permitting of the pull on the log after the dog engages the log.

28. In combination, a knee and dog for saw mill carriages, an arm pivoted at one end to the knee and at its opposite end to form a floating fulcrum for the dog, a spring interposed between the floating fulcrum and the dog, and means connected to the dog for first rocking the same on the floating fulcrum to move the dog in a curved path to engage a log and after such engagement to move the floating fulcrum and dog to pull the log toward the knee, the spring permitting of the pull on the log after the dog engages the log.

29. In combination, a dog for a saw mill carriage, a floating fulcrum for the same, means on one side of the floating fulcrum for operating the dog, and spring means on the other side of the floating fulcrum to act as a resistance to the dog when operated to engage a log, whereby the dog is first moved in a curved path and subsequently pulled, the spring permitting of the operating means imparting the dual movement to the hook.

30. In combination, a dog for a saw mill carriage, a floating fulcrum for the same, means for operating the dog, and a floating spring pivoted to the dog, whereby when the dog is actuated the dog will first be rocked in a curved path and subsequently bodily pulled, the spring permitting of the log being pulled after being engaged by the dog.

31. In combination, a dog for saw mill carriages, means for mounting the same, including a floating fulcrum, and a spring arranged to permit first a rocking movement of the dog about the fulcrum while the latter is floating and when such floating movement is interrupted by engagement of the dog with a log, converts such rocking movement into a floating movement only of the fulcrum to exert a pull on the log, and power means so applied as to cause a movement of the dog and floating fulcrum as permitted by the spring.

32. A swinging dog, a floating fulcrum therefor, means for swinging said dog on said fulcrum and simultaneously moving the fulcrum, and means for resisting the movement of the floating fulcrum.

33. A swinging dog, a floating fulcrum therefor, means for swinging said dog on said fulcrum and simultaneously moving the fulcrum, and spring means for resisting the movement of the floating fulcrum after the dog contacts with a log.

34. A swinging dog, a floating fulcrum therefor, means for swinging said dog on said fulcrum and simultaneously moving the fulcrum, and means inaugurated through and following movement of the dog after the latter contacts with a log to resist movement of said floating fulcrum.

35. A swinging dog, a floating fulcrum therefor, means for swinging said dog on said fulcrum and simultaneously moving the fulcrum, and means inaugurated with increasing effect through and following a predetermined movement of the dog to resist movement of said floating fulcrum.

In testimony whereof I affix my signature.

FREDERICK E. MARTIN.